A. B. CRUICKSHANK.
HEAT DISTRIBUTER FOR COOKING UTENSILS.
APPLICATION FILED AUG. 12, 1908.
928,634.
Patented July 20, 1909.
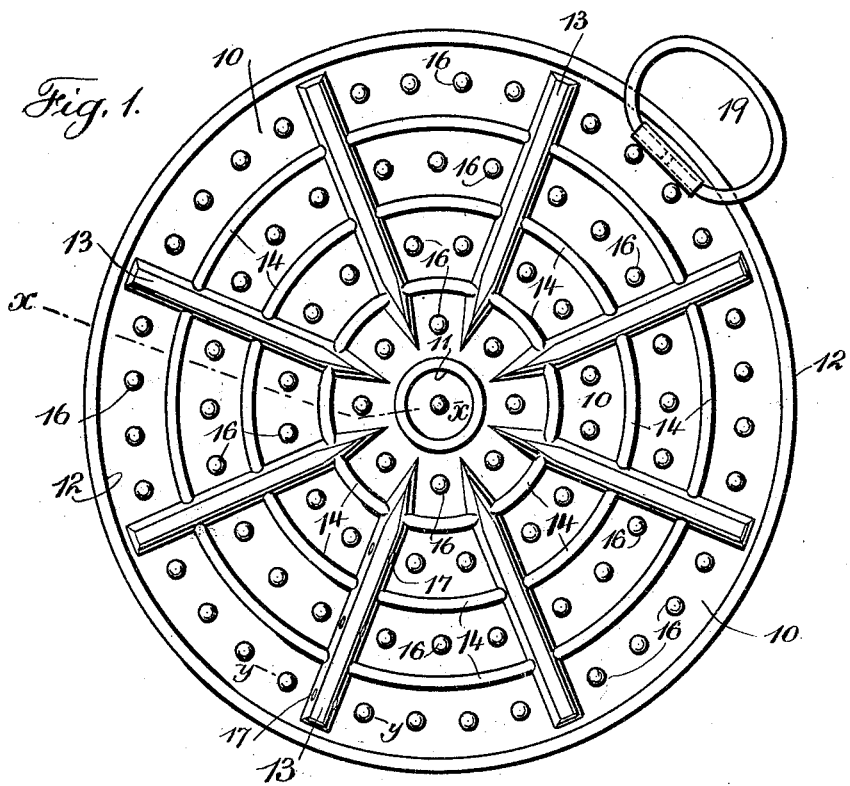
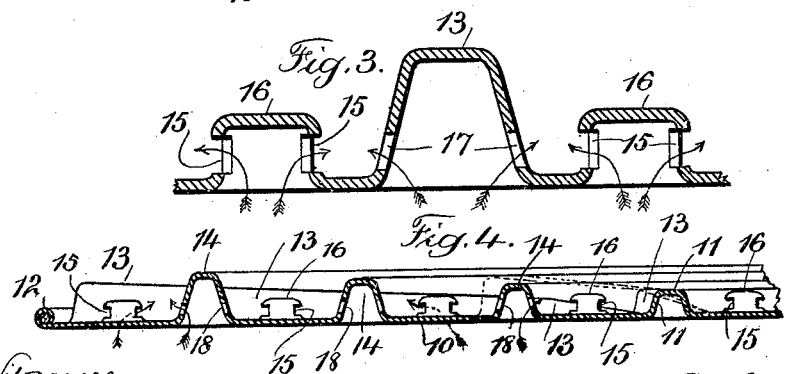
Witnesses
Chas H. Smith
A. L. Serrell
Inventor
Arthur B. Cruickshank.
by Harold Serrell
his Atty.
ANDREW. B. GRAHAM CO., PHOTO-LITHOGRAPHERS, WASHINGTON, D. C.

UNITED STATES PATENT OFFICE.

ARTHUR BENJAMIN CRUICKSHANK, OF LONDON, ENGLAND.

HEAT-DISTRIBUTER FOR COOKING UTENSILS.

No. 928,634.    Specification of Letters Patent.    Patented July 20, 1909.

Application filed August 12, 1908. Serial No. 448,221.

*To all whom it may concern:*

Be it known that I, ARTHUR B. CRUICKSHANK, a subject of the King of Great Britain, residing at London, England, have invented an Improvement in Heat-Distributers for Cooking Utensils, of which the following is a specification.

My present invention relates to heat distributers which are adapted in use to be placed between the fire and the different vessels used for various cooking purposes in order to diffuse and distribute the heat from the fire evenly over the bottoms thereof and to prevent the burning or overheating of the food which might be caused by the direct action of the fire on the vessels containing the food when the heat distributers are not employed.

I am aware that heretofore heat distributers have been constructed of a plurality of spaced apart plates, each of which is provided with a series of apertures; these apertures being so placed in the various plates as to bear a staggered relationship to one another in order to prevent the direct passage of the heat or flames from the fire to the vessel containing the food, and as hereinbefore indicated, the object of my present invention is the provision of an improved heat distributer to perform the same or similar functions.

In carrying out my present invention I preferably employ a single plate of sheet metal, which is so worked or stamped up as to be provided with a plurality of raised or cupped-up portions each having a side aperture therein, the said plate being preferably provided with a series of radially disposed ribs or corrugations and a series of concentric ribs or corrugations: one set of the said ribs or corrugations being intermediate of the other as will be hereinafter more particularly described.

In the drawing, Figure 1 is a plan view of my improved heat distributer. Fig. 2 is an enlarged section on line $x, x$, Fig. 1. Fig. 3 is a section on line $y, y$, Fig. 1 on a very much larger scale, and Fig. 4 is a cross section illustrating a modified form of my invention.

Referring particularly to the drawing, 10 indicates a plate of thin sheet metal which as shown, preferably is circular in outline, but which as will be understood, may be of any desired configuration. The plate 10 is preferably provided centrally with a circular rib 11 and with a rolled rim indicated at 12. Extending from the central circular rib 11 and between the same and the rim 12 and radially in equi-distant spaced apart positions the plate 10 is also provided with ribs 13. Intermediate of the ribs 13 and concentric with the central circular rib 11 I also employ the ribs indicated at 14 which in this instance lend strength to the distributer and prevent the same from buckling or changing shape under the action of the fire.

Before the plate 10 is stamped up as hereinbefore indicated, the same is provided in suitably spaced apart positions with a series of slots or slits indicated at 15 preferably arranged in pairs and when the plate is stamped up to provide the ribs therein those portions of the same between each pair of slots 15 are cupped-up as indicated in the drawing providing the caps indicated at 16, beneath which the slots 15 form passages for the heated air to pass through indirectly from the fire to the under surface of the vessel and resting upon the heat distributer.

As indicated in Figs. 1 to 3 inclusive, the radial ribs 13 preferably extend between the central circular rib 11 and the rim 12 and incline downwardly from the latter to the former, and moreover these radial ribs 13 are preferably of greater height than the intermediate concentric ribs 14 so that the radial ribs form the supports for a vessel resting upon the distributer. It will be understood however, that I do not limit myself to this peculiar form of construction, because without departing from the nature and spirit of my invention, and as indicated in Fig. 4 the concentric ribs 14 may be of greater height than the radial ribs 13, in which instance as will be understood, the concentric ribs 14 are preferably continuous and the radial ribs 13 intermediate thereof, and as will be also understood I may provide either or both of the said radial and concentric ribs 13 14 respectively, with apertures indicated respectively at 17 18 therein in order that the heat passing from the fire to the under side of the vessel may be deflected laterally there through in the same manner as it is deflected through the hereinbefore described cupped-up portions.

For convenience in use I may also provide the heat distributer with a handle indicated at 19 which may be connected to the plate 10 in any suitable manner.

I claim as my invention:

1. A heat distributer comprising a single plate of sheet metal having a plurality of raised or cupped-up portions distributed throughout the surface of said plate and in each of which is provided a lateral aperture.

2. A heat distributer comprising a single plate of sheet metal and having a series of concentric ribs and a plurality of cupped-up portions in each of which is provided a lateral aperture.

3. A heat distributer comprising a single plate of sheet metal having a series of radially disposed ribs and a plurality of cupped-up portions in each of which is provided a lateral aperture.

4. A heat distributer comprising a single plate of sheet metal and having a series of radially disposed ribs, a series of concentric ribs and a plurality of cupped-up portions in each of which is provided a lateral aperture.

5. A heat distributer comprising a single plate of sheet metal and having a series of radially disposed ribs, a series of concentric ribs intermediate of the said radial ribs and a plurality of cupped-up portions each having a lateral aperture therein.

6. A heat distributer comprising a single circular plate of sheet metal having a central circular rib, a rolled rim, a series of radially disposed ribs in equally spaced apart positions extending between the said central circular rib and rolled rim, a series of ribs intermediate of the said radial ribs and concentric with the said central circular rib, and a plurality of cupped-up portions each having a lateral aperture therein.

7. A heat distributer comprising a single circular plate of sheet metal having a centrally disposed circular rib, a rolled rim, a series of equally spaced radially disposed ribs extending between the said central circular rib and the said rim, and a series of ribs concentric with the said central circular rib and intermediate of the said radial ribs, the upper surface of the said radial ribs being inclined from the said rim toward the said central circular rib and the sides of the said radial and concentric ribs being provided with apertures.

8. A heat distributer comprising a single circular plate of sheet metal having a centrally disposed circular rib, a rolled rim, a series of equally spaced radially disposed ribs extending between the said central circular rib and the said rim, and a series of ribs concentric with the said central circular rib and intermediate of the said radial ribs, the upper surface of the said radial ribs being inclined from the said rim toward the said central circular rib and a plurality of cupped-up portions each having a lateral aperture therein.

9. A heat distributer comprising a single plate of sheet metal having a series of radially disposed ribs, a series of concentric ribs, the height of the ribs of one series being different to that of the height of the other series, and a plurality of cupped-up portions in each of which is provided a lateral aperture.

10. A heat distributer comprising a single plate of sheet metal having a series of radially disposed ribs, a series of concentric ribs intermediate of the said radial ribs, the said radial ribs inclining downwardly from the outer edges of the heat distributers to the center thereof and being of a greater height than the said concentric intermediate ribs, and a plurality of cupped-up portions each having a lateral aperture therein.

11. A heat distributer comprising a single plate of sheet metal having a plurality of cupped-up portions arranged in concentric circles and in each of which is provided a lateral aperture.

12. A heat distributer comprising a single plate of sheet metal provided with corrugations and having a plurality of cupped up portions distributed throughout the surface of said plate and in each of which is provided a lateral aperture.

Signed by me this 30th day of July 1908.

ARTHUR BENJAMIN CRUICKSHANK.

Witnesses:
H. D. JAMESON,
F. L. RAND.